United States Patent
Lewis

(10) Patent No.: US 9,264,319 B2
(45) Date of Patent: *Feb. 16, 2016

(54) MULTIMEDIA COMMUNICATOR

(71) Applicant: 1st Communications Inc., Las Vegas, NV (US)

(72) Inventor: Scott W. Lewis, Las Vegas, NV (US)

(73) Assignee: 1st COMMUNICATIONS INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,195

(22) Filed: Sep. 8, 2014

(65) Prior Publication Data

US 2015/0134805 A1    May 14, 2015

Related U.S. Application Data

(63) Continuation of application No. 11/686,302, filed on Mar. 14, 2007, now Pat. No. 8,830,963.

(51) Int. Cl.
| | |
|---|---|
| *H04W 4/00* | (2009.01) |
| *H04L 12/24* | (2006.01) |
| *H04W 88/06* | (2009.01) |
| *H04L 29/08* | (2006.01) |
| *H04W 88/18* | (2009.01) |
| *H04M 1/725* | (2006.01) |

(52) U.S. Cl.
CPC .............. *H04L 41/5041* (2013.01); *H04L 67/12* (2013.01); *H04L 67/16* (2013.01); *H04L 67/28* (2013.01); *H04W 88/06* (2013.01); *H04M 1/7253* (2013.01); *H04M 2250/02* (2013.01); *H04M 2250/06* (2013.01); *H04M 2250/10* (2013.01); *H04W 4/00* (2013.01); *H04W 88/18* (2013.01)

(58) Field of Classification Search
None
See application file for complete search history.

(56) References Cited

U.S. PATENT DOCUMENTS

| | | | |
|---|---|---|---|
| 5,636,123 A | 6/1997 | Rich et al. | |
| 5,870,685 A | 2/1999 | Flynn | |
| 6,647,269 B2 * | 11/2003 | Hendrey et al. | ............ 455/456.3 |
| 7,117,083 B2 | 10/2006 | Rothman | |
| 7,539,175 B2 | 5/2009 | White et al. | |
| 8,275,382 B2 | 9/2012 | Lewis | |
| 2003/0119554 A1 | 6/2003 | Horn | |
| 2005/0192705 A1 | 9/2005 | Pinney | |

(Continued)

OTHER PUBLICATIONS wp_13_White_Paper_Wi-Fi_Mobile_Convergence, (Apr. 2006), Senza Fili Consulting for Wi-Fi Alliance.

*Primary Examiner* — Faruk Hamza
*Assistant Examiner* — Aixa Guadalupe-Cruz
(74) *Attorney, Agent, or Firm* — Sawyer Law Group, P.C.

(57) ABSTRACT

A multimedia communicator is disclosed. The multimedia communicator comprises a processing unit; and a storage device coupled to the processing unit. The multimedia communicator further includes a plurality of interfaces to allow the multimedia communicator to offer a user a plurality of services. The MMC which includes a microprocessor computing system may be located in a car, for example, or within a handset similar to handsets presently utilized for cell phones. The MMC may be connected to a WiFi Internet connection, a cellular network, a satellite radio or equivalent satellite network, or to other available wireless networks. Additionally, the MMC has the potential to interface with GPS signals as desired.

20 Claims, 9 Drawing Sheets

(56) References Cited

U.S. PATENT DOCUMENTS

| | | |
|---|---|---|
| 2005/0249196 A1* | 11/2005 | Ansari et al. ............... 370/352 |
| 2005/0286546 A1 | 12/2005 | Bassoli et al. |
| 2006/0063560 A1 | 3/2006 | Herle |
| 2006/0286984 A1 | 12/2006 | Bonner |
| 2007/0018952 A1 | 1/2007 | Arseneau |
| 2007/0222734 A1 | 9/2007 | Tran |

* cited by examiner

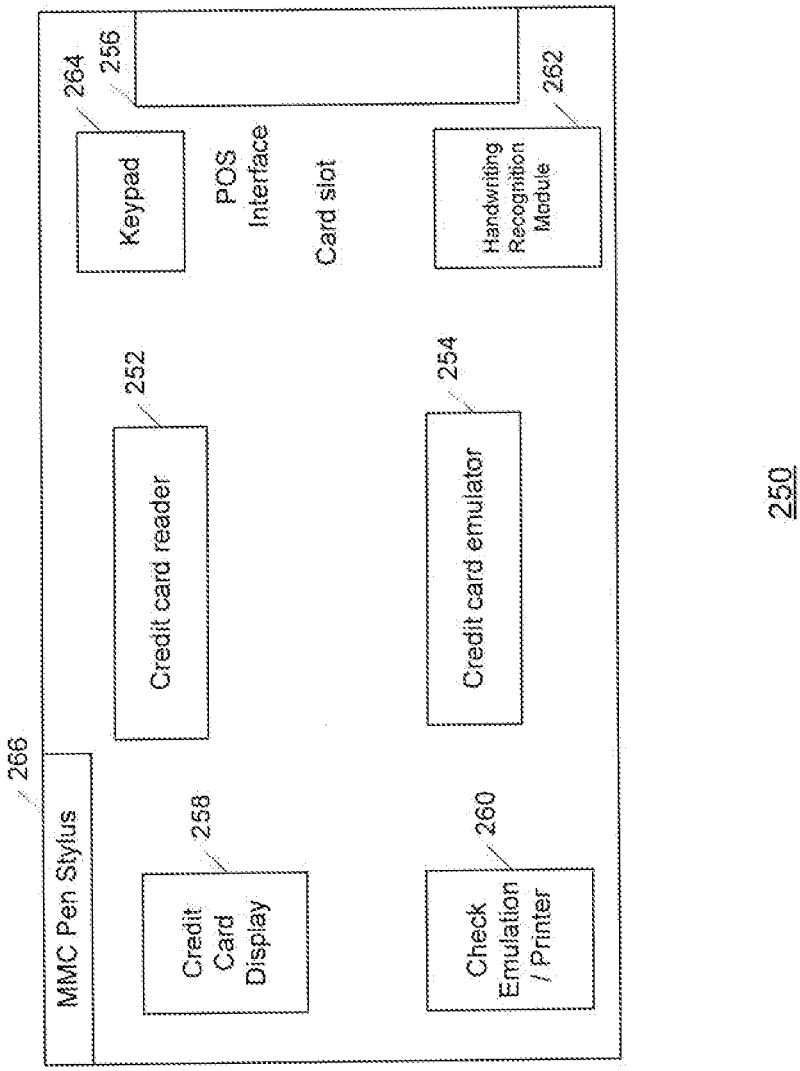

MULTIMEDIA COMMUNICATOR

CROSS-REFERENCE TO RELATED APPLICATION

Under 35 U.S.C. 120, this application is a Continuation Application and claims priority to U.S. application Ser. No. 11/686,302, filed Mar. 14, 2007, entitled "MULTIMEDIA COMMUNICATOR," which is incorporated herein by reference.

FIELD OF THE INVENTION

The present invention relates to wireless communications and more particularly to data and voice communications via a plurality of systems and networks.

BACKGROUND OF THE INVENTION

Wireless communications have resulted in massive changes in home and office telecommunications. Much office work is now carried out by utilizing wireless communications such as the Internet, for example. Telephones can now be operated via voice over Internet protocol (VOIP), if adequate WiFi or Internet facilities are available. However, when users leave their home or office, then they usually need to utilize a cellular network, which may be expensive.

Accordingly, what is needed is a system and method which makes possible a low cost approach for telephonic and data communications in the WiFi and cellular markets. The present invention addresses such a need.

Accordingly, what is needed is a system and method that addresses the above-identified issues. The present invention addresses such a need.

SUMMARY OF THE INVENTION

A multimedia communicator is disclosed. The multimedia communicator comprises a processing unit; and a storage device coupled to the processing unit. The multimedia communicator further includes a plurality of interfaces to allow the multimedia communicator to offer a user a plurality of services. The MMC which includes a microprocessor computing system, may be located in a car, for example, or within a handset similar to handsets presently utilized for cell phones. The MMC may be connected to a WiFi internet connection, a cellular network, a satellite radio or equivalent satellite network, or to other available wireless networks. Additionally, the MMC has the potential to interface with GPS signals as desired.

BRIEF DESCRIPTION OF THE DRAWINGS

FIG. 2A illustrates a component that can be integrated into the MMC or be separate therefrom, allowing three functions.

DETAILED DESCRIPTION

The present invention relates to wireless communications and more particularly to data and voice communications via a plurality of systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
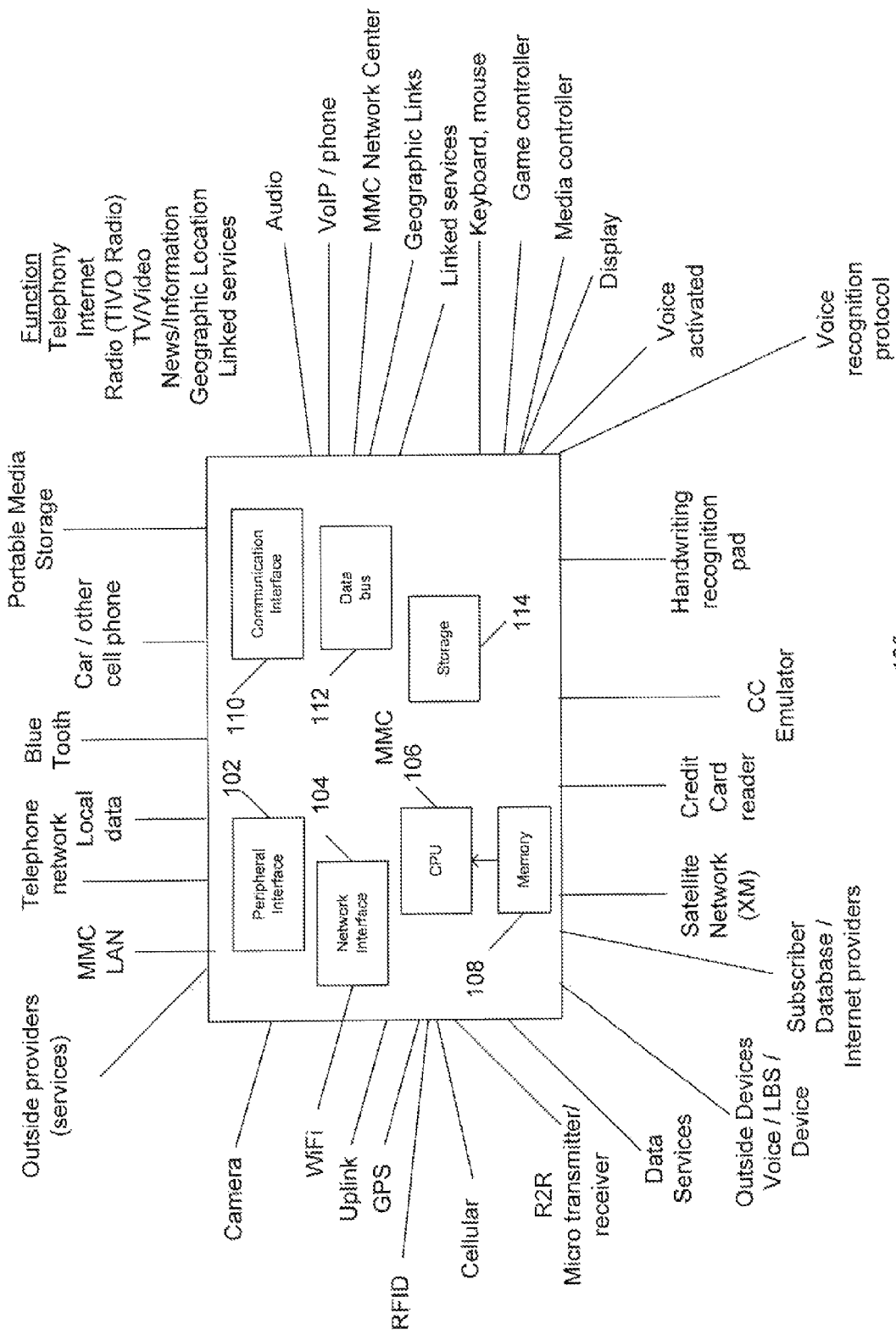
FIG. 1 illustrates a multimedia communicator in accordance with the present invention.

FIG. 1 illustrates a multimedia communicator (MMC) 100 in accordance with the present invention. The MMC 100 includes a peripheral interface 102, network interface 104, CPU 106, memory 108, communication interface 110, data bus 112, storage 114, WiFi connection/interface, uplink GPS/traffic data connection/interface, cellular connection/interface, R2R (micro transmitter/receiver) connection/interface, data services connection/interface, outside devices voice/LBS (location based services)/device connection/interface, subscriber database/Internet providers connection/interface, satellite radio network connection/interface, voice recognition protocol connection/interface, voice activated connection/interface, display connection/interface, linked services connection/interface, geographic links connection/interface, VoIP connection/interface, car cell phone connection/interface, and an outside providers (services) connection/interface.

The MMC 100 which includes a microprocessor computing system 102, may be located in a car, for example, or within a handset similar to handsets presently utilized for cell phones. The MMC 100 may also be located as a standalone unit at a home or built into a set top box, for example. Additionally, the MMC 100 may be incorporated within another device, such as a cell phone, media player, car stereo or satellite receiver.

The MMC 100 may be connected to a WiFi Internet connection, a cellular network, a satellite radio or equivalent satellite network, or to other available wireless networks. Additionally, the MMC 100 has the potential to interface with GPS signals as desired.

The MMC may also be located in a house, in a car, as a standalone unit, or built into a set box. Additionally, the MMC can also be incorporated into some of the common devices with which it interfaces, such as a cell phone. The MMC could, for example, be built into a cell phone, media player, car stereo or satellite receiver.

Utilizing one or more of the above connections, the MMC 100 is then connected to databases which make it possible to offer the user many different kinds of services, such as geography and location-based services, for example. Because the MMC 100 also includes a storage device 104, database information as well as desired user information, such as email, may be stored within the MMC 100 as well as accessed from exterior locations. In a multimedia communicator hybrid embodiment, the storage capability within the MMC 100 also allows for seamless accessibility to voice and data.

In a hybrid embodiment, optimization features allow for the lowest possible transmission costs by utilizing databases in connection with the ability to switch between input and output sources, i.e., from a cellular network to a WiFi network and then back, for example, depending upon quality of reception, network availability, transmission and quality of signal cost factors.

Multimedia Communicator (MMC) 100

The multimedia communicator (MMC) 100 ("MMC parent") comprises a microprocessor based computing system which includes a central processing unit 102 and associated storage 104. The MMC 100 may be located in one or a plurality of locations. The MMC 100 may have an operating system such as Windows CE or the like. Its shape may resemble that of a handset similar to a cell phone, or as discussed earlier, it may be a standalone unit or incorporated within another device, such as a media player or set top box.

Referring again to FIG. 1, the MMC 100 has a plurality of input sources and interfaces. These may include:

(1) Connections to one or a plurality of WiFi areas and to the Internet via WiFi.

(2) Connections to one or a plurality of cellular networks.

(3) Connections to one or a plurality of satellite radio networks and/or other satellite networks.

(4) Connections to a GPS system.

(5) Connections to a voice over IP system, which may be included as a software or hardware embodiment within the MMC.

(6) A display.

(7) Voice recognition input and/or capabilities.

(8) Connections to standard car interface audio/data systems.

(9) Specific, particular interfaces for specific models of cell phones.

(10) Connections for a computer.

(11) Connections for sending audio/data/video (feedback) as well as receiving audio/data/video.

The MMC 100 is capable of operating in real time, when connected to one or a plurality of networks. It also has storage capability, utilizing the memory 108, including the capability of downloading data, audio and video materials. The combination of real time capability and operating from storage allows it to receive emails, video information, satellite radio programs, and voice/data transmissions, and then to play these back for the user at a time the user selects.

The MMC 100 is also connected to a network center, which may be located in one or a plurality of locations. The network center may be a data storage system located at one or a plurality of locations. The network center has the capability of (1) receiving instructions and/or data from the MMC 100, (2) accessing information from databases and from the MMC 100 in order to create and provide services, (3) placing and receiving phone and/or data calls, and (4) in a hybrid embodiment switching between cellular, WiFi and satellite networks in order to achieve optimization of lowest possible transmission and reception cost as well as optimization of level of signal quality desired in relation to cost factors. Utilizing the network center and databases within the MMC 100 and network center, the MMC 100 is capable of providing a number of services in addition to playback of audio, video and data programming, as further described below.

Figure 2:
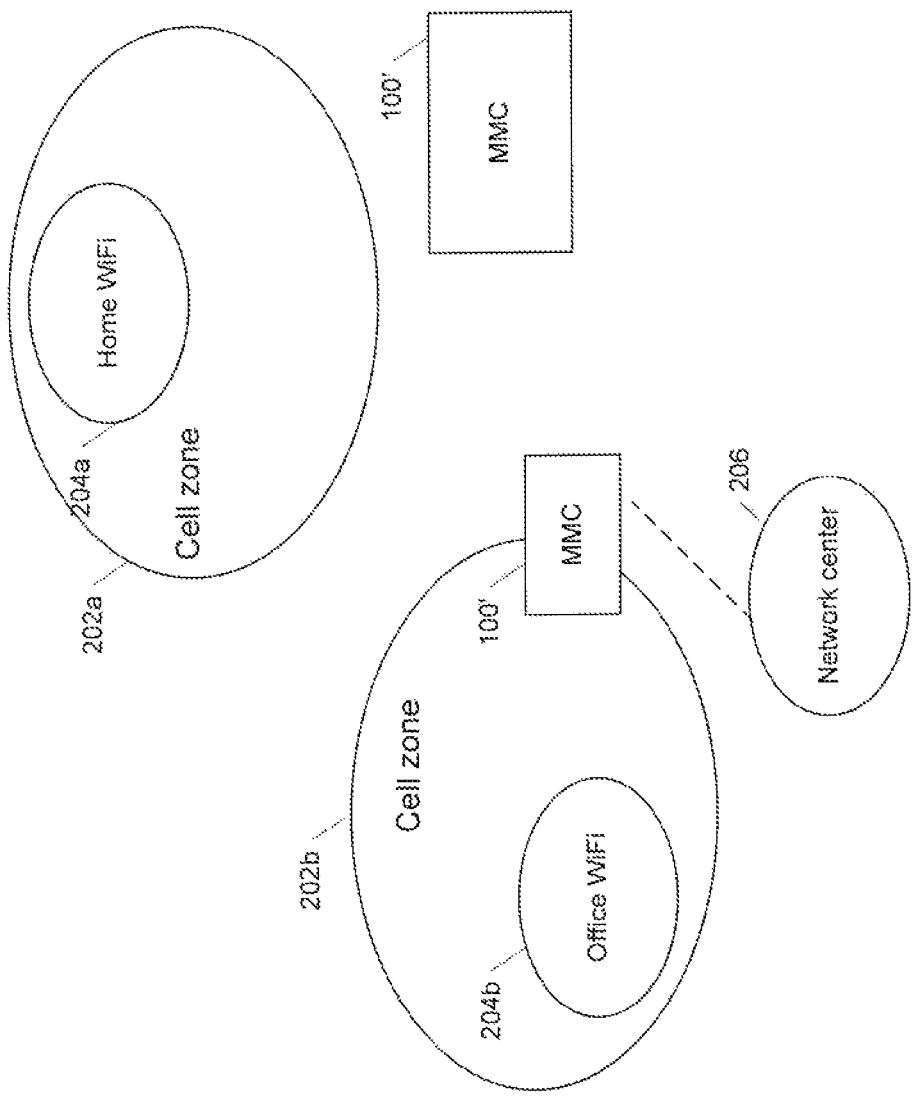
FIG. 2 shows the MMC in relation to cell zones, which may contain home and office WiFi networks, and a network center.

FIG. 2 shows the MMC 100' in relation to cell zones 202a and 202b, which may contain home WiFi networks 204a and office WiFi networks 204b, and a network center 206. As can be seen, the MMC 100' may be utilized within one or a plurality of cell zones 202a-202b and WiFi zones 204a-204b, and the user of the MMC 100' may find it necessary to move between various cell zones 202a-202b and WiFi zones 204a-204b.

Services

The MMC 100 can provide services on different levels of complexity. All levels of services include an outgoing signal as well as an incoming data/voice/video capability. For examples, cars utilizing MMC services are able not only to receive incoming GPS information but also have the capability to send GPS information back to a network center, so that specialized geographic services can be provided to drivers.

Friend Finder

Since the MMC has GPS functionality, it can be used in conjunction with a friend/location finder service.

In the location finder service, the destination is specified using either the MMC keyboard, media controller, voice recognition, or nomenclature, or optimization techniques. From this point the user can see (on the MMC screen) or hear (via the MMC audio output) details about the destinations location using the combination of the destination location/coordinates (at the network or peer/device/MMC level) and the user location via the GPS/other MMC location techniques.

The friend finder service operates similarly to an always-on telephone service. A list or lists of friends (who are fellow MMC users where the MMC has a unique identity code for location/identity purposes) can be entered into the MMC via the keyboard, media controller, voice recognition, or nomenclature—or via the web: e.g., "My Space", "My Friends", or the network center's own secure community site.

The network center can include a "secure" community site—where members can join only when they have a legally bought MMC, valid associated credit card with the MMC billing, valid associated MMC driver's license, automobile license number and details (for MMC's theft service and to allow for more accurate demographic matching/other network center services) and a signed user agreement not to spam, annoy, etc., other members. In this way no spam is allowed and members can have penalties (e.g., turning off their MMC) imposed by the network center given violations.

Friends are established by accepting/rejecting offers (as in My Space) to create friends. They can then place calls (MMC-MMC and phone-MMC and MMC-phone) to other members with pictures/video/music/or messages/custom ring tones appearing at the other MMC (in the case of MMC-phone end phone limitations will apply). The users can also put "caller-ID enabled", "caller-ID blocked", etc., on their line or for specific friends (e.g., allow only Bobby2 and Sally45 to come through my MMC for calls, but everyone for T3 email friends replies.) Lastly, the user can list for Friend Finder service "location enabled", "caller-ID blocked," etc., on their MMC or for specific friends (e.g., allow only Bobby2 and Sally45 to "see me", but be blocked/invisible for everyone else.) The MMC user can then use the MMC via the keyboard, media controller, voice recognition, or nomenclature to locate Sally45 or show Bobby230 s location—the locations will be displayed on the MMC or with audio sent from the MMC. Information on the location of customers will be stored securely either at the network center (network centric using WiFi, cell phone or telephone for communication) or within the individual MMCs (using WiFi, cell phone, telephone or R2R for communication.) This will be a safe and significant innovation for finding friends in shopping centers or the like where WiFi/other networks exist or via R2R with no network requirements (e.g., locating miners/soldier caught in caves, tunnels or deserts.)

Directional functionality

Two directional functions may be utilized with the MMC 100: (1) the network center function and (2) the peer-to-peer local center function.

1. Network Center Function ("Network Centric Function")

In the network center model, for example, data may be gathered from all the cars in a particular portion of a road. This information is then transmitted from the cars to a central network center. The network center puts together the information and then transmits the results back to the drivers. For example, as a result of this live traffic pattern analysis, drivers will then learn which areas are congested and be notified of alternate traffic choices they may wish to choose.

2. Peer to Peer Local-Center Function ("Peer Centric Function")

Peer to peer local-center functioning operates as in the following example. Information from the cars on a specific portion of a road is transmitted to the Internet, but not necessarily to the network center. Because each MMC 100 has a database, is connected to the Internet or other networks, and also may have access to a CD ROM or equivalent in the car, the MMC is able to assemble the information from the Internet or other MMCs, together with its own databases, and produce a localized traffic report and other services and applications via a peer to peer architecture. This function would be especially useful in the event of a breakdown in communications, or in a military application where there may not be a network center. In these instances, the MMC 100 can still function effectively.

"Level 1" Service

Service from the MMC 100 at the lowest level of complexity includes incoming information, such as that from GPS systems, as well as a related outgoing signals loop. For example, Level 1 service might utilize GPS information on the location of the vehicle, combining that with satellite information regarding weather for the location where the vehicle is traveling. Through the combination of the moving vehicle location information and the satellite weather information, localized forecasts could be provided via the MMC 100 for the vehicle driver. Forecasts and related data would be provided on the display of the MMC 100.

In one embodiment, Level 1 services can be applied to traffic applications. Utilizing GPS information, and having available information on position, change of position time and speed of the vehicle, then most traffic applications can be carried out at level 1.

"Level 2A" Service

Level 2 service provided by the MMC 100 would include additional measurements in addition to, for example, GPS incoming data. Such additional measurements would originate from additional sensors already installed on a vehicle or MMC, and the combination of this additional information with GPS information and satellite weather information would allow for providing a more detailed, location-specific, time-specific weather forecast for the driver via the MMC 100 and its display.

"Level 2B" Service

Level 2B of service is realized by installing new sensors on the vehicle or person. These sensors may detect such factors as temperature, moisture, humidity, barometric pressure and wind speed. Combining information from these additional sensors, in addition to outside databases, including those provided by outside service providers, allows for the creation of very complete and integrated weather and traffic databases for an entire area. Through the utilization of a feedback loop for GPS and this constantly changing information derived from additional measurements, geographic and location-specific databases can be created in real time, thus increasing their value.

Such databases can allow for microprediction of weather patterns, for example, and for the creation of microweather databases.

Databases

Databases may be maintained and accessed at a network center in one or a plurality of locations, and/or within the MMC 100, as well. In contrasting to existing services, which require multiple sensors on the road, this system allows for the creation of information on a real time basis from multiple sample sources.

Telephony Services

The MMC 100 can function as a WiFi phone when located in a WiFi area. This allows for telephony at low or no cost. Peer to peer and R2R technology can be utilized for voice and other services.

Internet Services

The MMC 100 can access Internet service when located in a WiFi area, thereby, for example, allowing for collection and storage of email information, which the user can then access at any preferred time. Software within the MMC 100 and the network center allows the user to indicate preferences for types of information desired to be collected and stored, such as stock updates.

Radio Services

The MMC 100 segments all radio programs and their connectivity, which may be received either from WiFi networks, satellite networks, and/or cellular networks, and then rejoins the segmented packets of information or connectivity, overcoming the lack of contiguous signals and providing the user with a continuous playback uninterrupted by service disconnections. For example, the MMC can be receiving and playing a satellite radio channel. When the satellite reception is blocked or fails, the MMC can transparently switch to the Internet satellite radio transmission via a WiFi network unaffected by the satellite reception interference.

Radio services may include, but are not limited to:

1. Satellite-based services, such as receiving reception from a satellite source.

2. Analog based services, such as receiving or recording an analog radio station.

3. Digitally based services, such as the reception of digital radio transmissions.

4. Internet based services, such as a podcast or other type of Internet feature.

Television and Video Services

Similarly, the MMC 100 can organize and store segments of video information for later continuous playback. The software within the MMC 100 allows for varied modes of operation, in terms of still images, and varied resolution displays shown at different frames per second. Combined voice/data/video services can offer interactive information services such as voiceovers during stock, traffic, and weather displays.

Television services may include, but are not limited to:

1. Satellite-based services, such as receiving reception from a satellite source.

2. Analog based services, such as receiving or recording an analog-based television station.

3. Digitally based services, such as the reception of digital television transmissions.

4. Internet based services, such as the reception of a television or video signal, or other video application, via the Internet.

Printer

The MMC has the capability of printing receipts, tickets, coupons, and related information such as emails received from the MMC.

Scanner/Fax Unit

The MMC has the capability of supporting/interacting with a scanner and fax unit, in order to scan documents.

Video/Still Camera

The MMC has the ability to store and/or stream uploads and downloads of video using a combination of local storage and multiple redundant networks. This capability makes it possible to upload and download continuously, thereby making possible portable use while downloading and uploading. Utilizing the MMC, video can be sent down by various networks and cached in local storage. The same technique can be utilized for uploads, resulting in more efficient transfers.

Push Technology

Push technology involves utilizing the network center to push media and optimization information to the MMC. Typical types of media that can be pushed are email, voice mail, music downloads and video downloads. Web optimization wherein the network center monitors the MMCs constituent website or users' web sites in order to minimize the information required to communicate with the MMC. The network center pushes updates to the targeted site. The network center can timestamp each file associated with the web site to a specific level. The network center can record this level. Then, for example, a Dow Jones average template can be downloaded continuously.

Portable Media Storage

The MMC can play media from a self-contained media player or memory stick device inserted in the MMC or a music player/iPod or media cell phone connected to the MMC.

Anti-Theft Services

With anti-theft services, the MMC can transmit information linking the GPS information and critical information about the car that could be transmitted to a network. For example, if a car was stolen the location of the car could be identified utilizing the GPS system and a signal could be utilized to disable the car. The information could be located within the car or could be incorporated outside of the car.

Gaming Services

The gaming services would provide an optimized method for network gaming. It would provide an open platform for games in the display vehicle home/mobile device. It utilizes the ability to connect to the Internet via a WiFi and other networks utilizing a game controller.

Link Services

Link services are based on information about the user stored within the databases utilized by the network center and the MMC 100. Link services also require a feedback loop of data to the network center in order to allow for link services to be carried out.

For example, once a user has requested a service, such as a meal, the MMC 100 would send the request for the link service to the network center. The network center would utilize existing database information to determine which food service companies are near the user, in conjunction with GPS information to locate the user. The network center would then make use of the uplink/feedback loop to perform such functions as ordering the appropriate food item and verifying credit card information. The user would then be able to pick up their order quickly and efficiently when they arrive at the food service outlet. Such services provided by the MMC 100 save the user time, increase business for linked businesses and service, and help to eliminate fraud in monetary transactions.

What link services allows is the ability to utilize one service that is, for example, the radio, to listen to a song and then to order the song or a related item utilizing another service. For example, listening to a song offers the ability to purchase that song or a related song or a related media. In this embodiment, you could, for example, hear a review, purchase the related movie. This would be triggered through a service purchase through an outside vendor. Similarly, with stock trading, the ability to display stock information, to make trades based on the link services can be provided through a general purpose interface.

Predictive/Preference Services

Predictive/preference services occur when an MMC/MMH user enters an active network area. When an MMC/MMH user enters an active network area, the network will recognize the identity of the user and also be able to access databases which describe the user's preferences.

Because the network center and/or the MMC/MMH has a database which contains the user's preferences, such as type of food preferred or choice of type of gas, once the user is recognized by the network the user can then be automatically provided with their pre-established preferences for the kind of service offered. A user entering the field of a network associated with a coffee house, for example, would be able to automatically have their order placed for the kind of coffee they preferred and their specific food preferences, and then be automatically billed. Once the user arrives at the service establishment, the user would need only to enter the "predictive preferences" line, for example, and then receive the coffee (i.e., the product or service) requested. Taking and preparing the order, and processing billing for the order, is accomplished automatically.

Automatic Billing service

Because the network center or MMC/MMH has a record of the user's billing information, the billing process can be carried out automatically as described above once the product or service has been delivered to the user.

Geographic or Location Based Services

The MMC 100 can also provide geographic or location-based services. For example, through the use of WiFi, GPS information, and databases, services such as real time personalized traffic routing maps can be created. WiFi triangulate information as well as GPS information may be utilized to locate the user's vehicle.

The MMC 100 can also function with other available networks, such as a cellular network.

The use of such combined real time and stored database information makes possible personalized traffic routing maps, a traffic gridmap for almost the entire United States, or localized microweather maps, for instance. These maps can have infinite resolution since they can be sourced from a central network center with an extensive library or access to outside data sources well beyond what is possible via locally stored data as in current CD ROM based vehicle navigation systems.

For example, in the instance of a forthcoming storm with heavy rain, such a system could provide drivers with advance warning on a very small, local scale, creating higher levels of safety, and possibly even insurance rate reductions.

Radio services can provide geographic-based access to local stations and programming, creating customized radio and television reception, which is currently not possible with satellite radio broadcasts. Relevant local stations could be determined by GPS and transparently inserted or made available via the local station's broadcast accessed via their Internet websites using the MMC WiFi or other network connectivity.

In another embodiment, real time traffic information received from the vehicle as above described could be combined with national sign regulation and street road rule databases. If, for example, a vehicle also had a speed sensor and this information was included in a feedback loop to the network center, services such as speed warnings could be created, providing information on traffic congestion data down to the specific lane of a highway. Additionally, the GPS signal positions could be compared and calculated, providing even more precise and up-do-date information.

It would be possible to provide a smart cruise control system within the vehicle, for instance. Operating at a Level 1 standard (see above), the smart cruise control system would tell the driver and the vehicle which operating speeds are legal, and that if the driver is exceeding the speed limit, issue warnings to slow down. Level 2 analysis would actually control the driver's car to make sure that deceleration takes place, offering major safety benefits to drivers and quite likely reduced insurance premiums.

If altitude information were added to the Level 2 standard of information, it would be possible to create three-dimensional mapping of roads. Such three-dimensional road maps could be combined with a microweather reporting service to give the driver a highly detailed display of information on current and forthcoming road conditions, including danger warnings due to rain combined with gradients such as "slippery turn ahead—slow down!"

System Condition Warning Service

The best example of this is "fuel empty" warning. Under that embodiment it would give an indication that the car is almost out of fuel and would provide an indication based on the GPS system of the locations of the closest fuel stations would also allow for the indication of traffic problems so that it would give the driver alternatives of getting refueled if the closest alternative were not the best.

Military Uses

By equipping soldiers with MMC 100 equipment including sensor information, and roads with information networks, military convoys would be able to make use of detailed information, providing them with a safer awareness of road and weather conditions in areas in which they are operating.

Military uses would include logistics and location information. For example, the system can determine the location of people, or the flow of logistics, such as supplies.

Optimizing Services

The MMC 100, and related software, is capable of optimizing services so that users can be offered the cheapest or safest routing services. The algorithm for optimization can be determined based upon costing and time databases, such as billing plans in cellular vs. roaming charges, for example.

Customized Ad Insertion

Geographic and linked services offer the possibility of customized advertising insertions, enabling advertisements to be played when the user is close to the business being advertised. For instance, if a driver is approaching food outlets or gasoline stations at forthcoming exits, localized ads can be played for these services as GPS information indicates that the driver is nearing a specific location.

Customized ad insertion could also be based on demographic-based information, since the network center and/or MMC 100 database contains user preference information.

Customized Media Insertion

Media which is geographically-based or demographically-based could also be inserted as the driver or user travels. For example, signals from local radio stations in the area in which the driver is traveling could be inserted into satellite radio transmissions.

The MMC 100 may be especially frequently utilized mostly in three areas of use: (1) motion (typically car applications), (2) mobile-cell phone telephony, and (3) fixed (typically use in the office or home).

Presets

An MMC has presets which allow for selecting between different services. For example, there may be AM/FM radio normal/high definition, internet presets, internet radio and video, and channel presets. Channel presets can be set utilizing buttons on the MMC or using a touch screen. In addition, the MMC can be utilized with an earphone that can enable a hands-free operation.

Channel Presets

The MMC, through a PC or internet through the network center the user or the service operator can organize a plurality of media channels. Media channels are aggregates of information between two dimensional time slots or data requirement. This would also allow presets for different Internet radio stations, Internet video stations, digital and analog radio, televisions and other media types.

Time slots—being able to select channels (such as business information, travel information, sports information) via time slots. The select channels could be associated with a range of sources such as a plurality of business channels, a matrix of information and both live media and recorded media.

Data requirements—the data is based upon the type. For example, the data type being "IBM" would result in a selection of media being about IBM from a preset list or set of sources.

Searchable Content Services

Accordingly, using the MMC a user can speak or type specific words which will result in searches that will result in text or other data—displayed, printed out, saved, loaded into preset channel features of the MMC, media and/or text. Data could be put in the MMC or a specific data requirement channel (such as IBM stock price) can be accessed via the MMC.

Integrated Transaction Space

A component is provided that can be integrated into the MMC or be separate therefrom that allows three functions. FIG. 2A illustrates such a component 250. Component 250 includes a credit/debit card reader 252, a credit card emulator 254, and a RFID/bluetooth/wireless—credit card, signature recognition, virtual checks interface program, slot 256, point of sale interface, credit display 258, check emulation/printer 260 and a handwriting recognition module. To obtain information which embodies a specific credit card, the user slides an existing credit card through the credit card reader 202 which stores the information in an encrypted or secure fashion within the MMC. In this way many credit cards can be stored within the same MMC device, eliminating the need for a credit card wallet. The credit card emulator 254 operates in three modes. In the first mode a magnetic strip simulator is ejected from the MMC and allows the user to swipe the MMC magnetic playback strip. In the second mode, rather than a magnetic strip, a single magnetic head is utilized. In the third mode, RFID/bluetooth/wireless connectivity is used through the POS interface 256 to link to relevant billing and accounting systems. In each case a full representation of the credit can be displayed on the credit card display 258. The credit card could be seen by an LED display on each side of the device 250. To verify secure transaction the input of the user's pin via the keypad 204 or signed credit card receipts via the handwriting recognition module.

Virtual checks can be created via the check emulator 260 which allows the creation for a virtual or printed check through the check emulator module 260 with the payee name and amount being inputted either automatically through the POS interface 256 or through the MMC manually through the MMC keypad. The check can be signed through handwriting recognition module 262 by the user's signature using a stylus 266 and then transmitted as a virtual check through the POS interface 256 or as a printed check through check emulator/printer module 260. The MMC can then interface via the POS interface 256, the internet, cell network, WiFi or the network center to organize and keep track of all user financial transactions. In this way, the user with a credit card MMC can ensure to have a balanced account for review of by MMC at all times.

Motion MMC 100'''

Figure 3A:
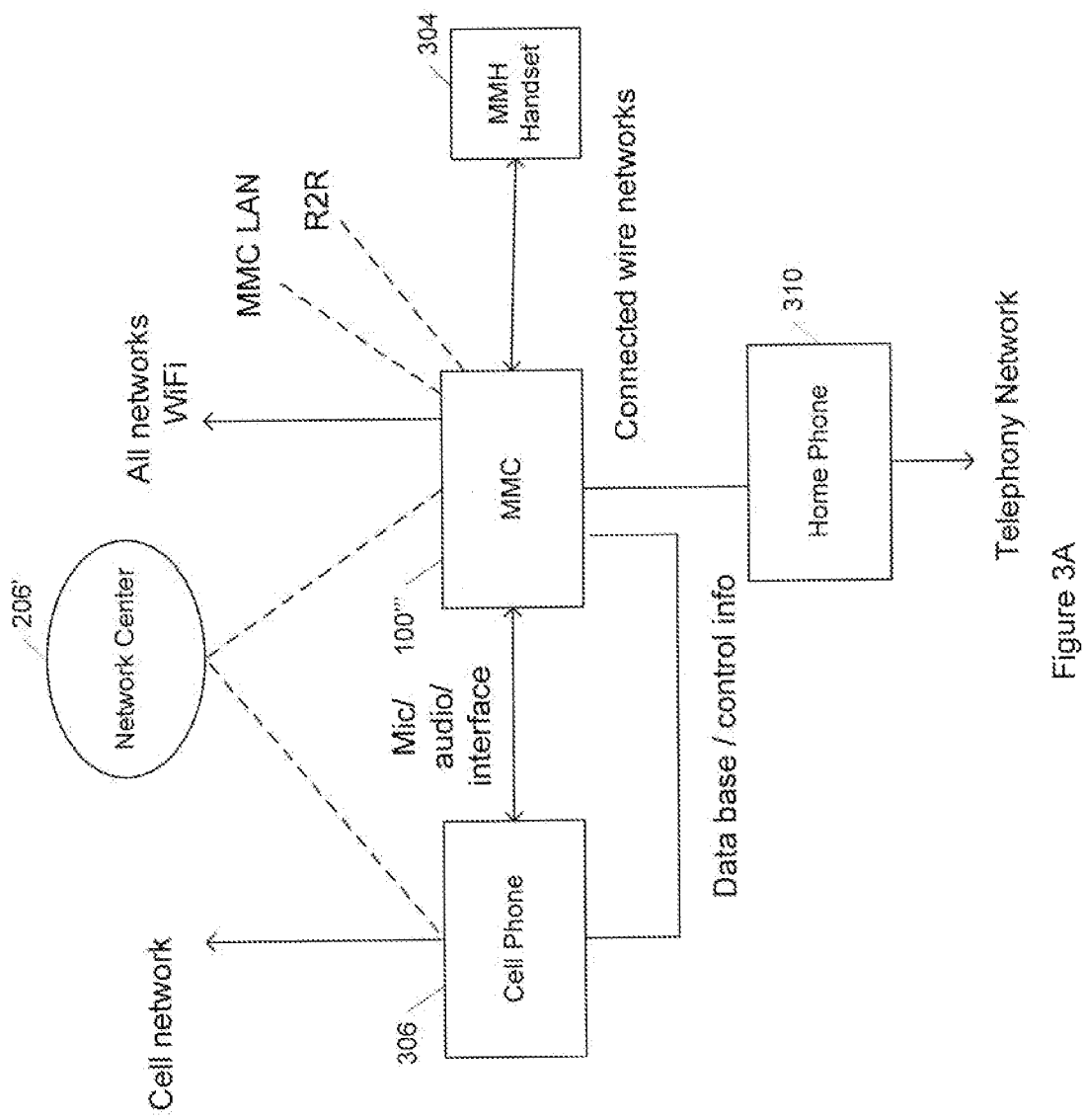
FIG. 3A shows one embodiment of a motion (car or portable application) utilization of the MMC.

FIG. 3A shows one embodiment of a motion (car application) utilization of the MMC 100'''. The MMC 100''' may be connected to a cell phone 306, an MMH handset 304, a network center 206', R2R (radio transmitter to radio transmitter) system, and a home phone 310. It can communicate to WiFi networks, to the network center and to telephony networks.

MMC Jr. Client and R2R Networks

Figure 3B:
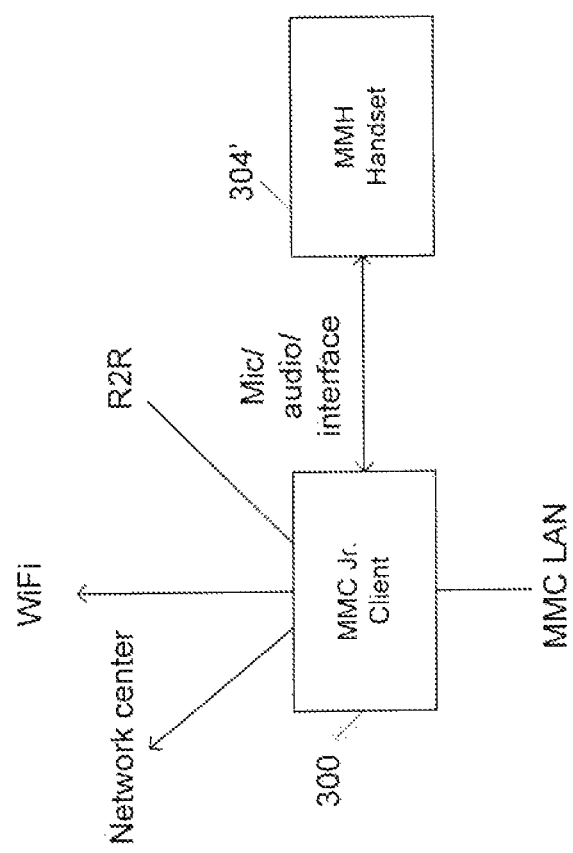
FIG. 3B shows a MMC Jr. client coupled to an MMH handset.

FIG. 3B shows a MMC Jr. client 300 coupled to an MMH handset 304'. The MMC Jr. client 300 has a subset of the functionality of the MMC. The MMC Jr. Client 302 connects to the network center, WiFi networks, R2R (radio transmitter to radio transmitter systems), and MMC LAN. The coupling between the MMC Jr. Client 300 and the MMH handset 304' includes a microphone and audio interface.

The MMC 100''' can operate with radio transmitter to radio transmitter (R2R) systems, which involve microtransmitters transmitting to each other. The use of R2R systems makes possible the provision of an uninterrupted flow of data and information from the MMC 100'''. If, for example, a WiFi signal is lost when a driver is passing underneath an underpass, microtransmitters can transmit backwards or forwards to the point where a signal is still available.

Similarly, the MMC Jr. Client 300, which may be mounted in a car, can transmit and/or relay signals between MMC units or an MMC and a network center 206', WiFi network, or R2R network.

Nomenclature Data-Based Services

Existing location-based services are currently driven by address data. In contrast, people intuitively think in "nomenclature" data, which is data related to where the user is located at any particular point in time.

What is needed is a system driven by and based on nomenclature data. There are two kinds of nomenclature data: (1) specific nomenclature data; and (2) general nomenclature data. In a highway situation, for instance, "City Burger" would be an example of specific nomenclature data; and "Starbucks nearest to me off freeway" would be an example of general nomenclature data.

Media Controller Services

In the preferred embodiment, this would comprise a smart thumbwheel controller, which could advance static or a series of phrases that are optimized for the user based on the email or statistical relevance of a particular phrase. For example, if the term or phrase "I would like to meet with you on _____" that phrase might be used several times on the media controller in a manner that would have statistical relevance to the user. Accordingly, this would be another service of the MMC.

Multiple or Redundant Networks

Figure 4A:
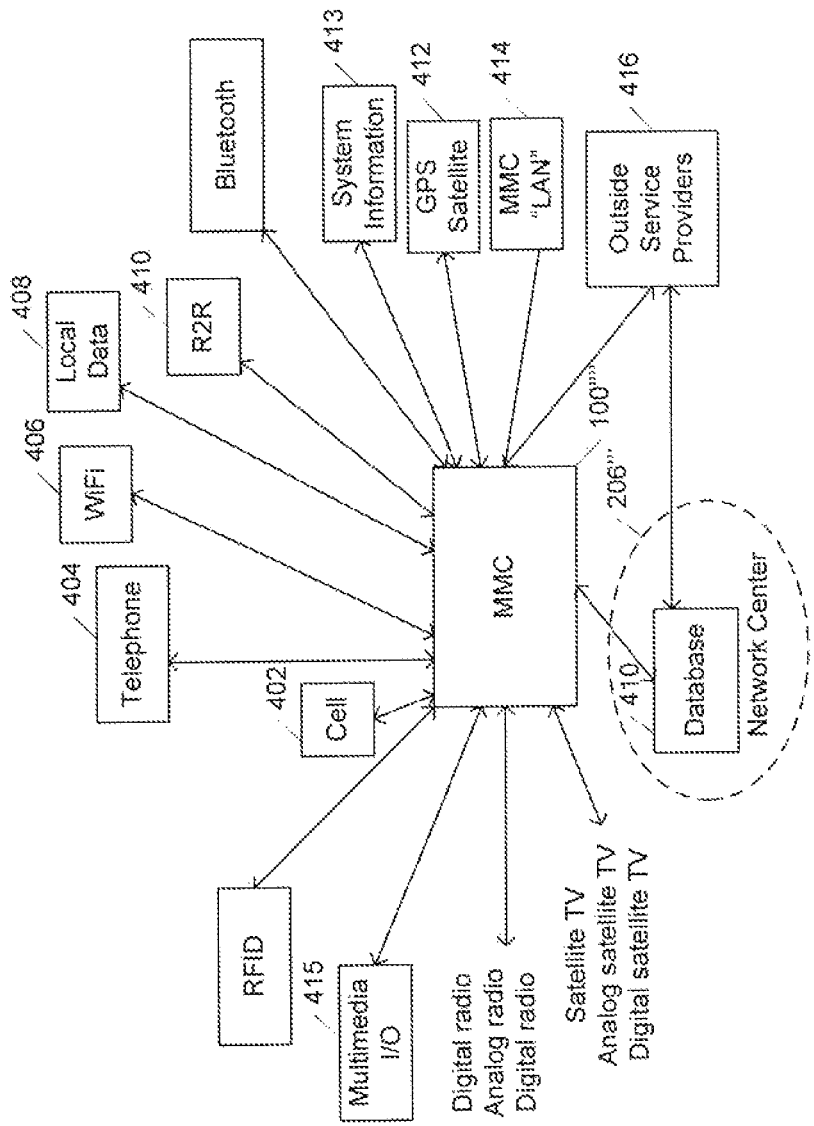
FIG. 4A shows how the MMC utilizes multiple or redundant networks, complimentary networks, which allow it to provide a greater degree of coverage for one-way services or information services.
Figure 4B:
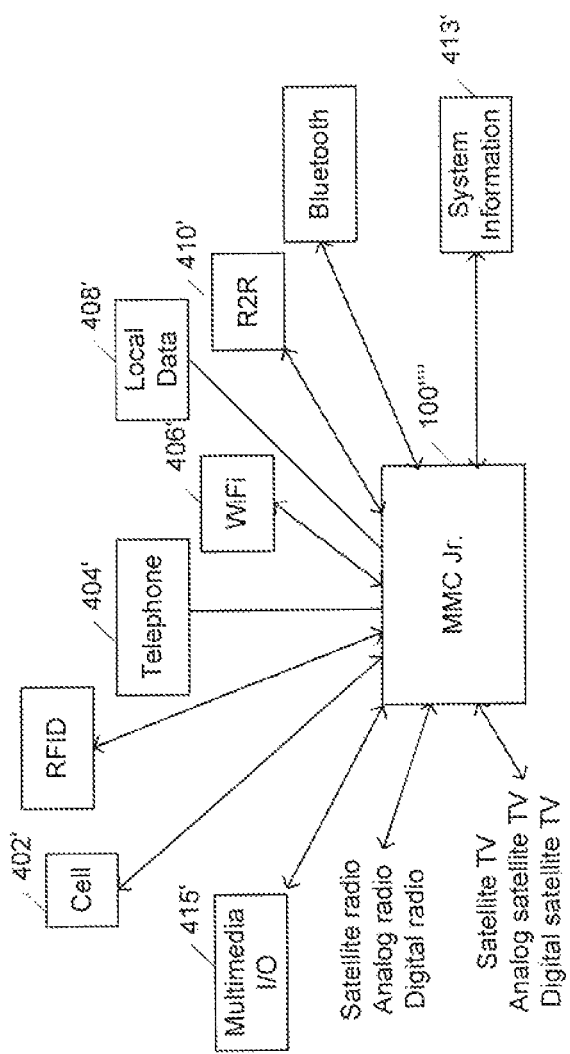
FIG. 4B shows the MMC jr. utilizes multiple or redundant networks, complimentary networks, which allow it to provide a greater degree of coverage for one-way services or information services.

FIG. 4A shows how the MMC 100'''' utilizes multiple or redundant networks, complementary networks, which allow it to provide a greater degree of coverage for one-way services or information services. In order to accomplish uninterrupted service, the MMC 100'''' may utilize cell networks 402, telephone networks 404, WiFi networks 406, local data networks 408, radio to radio (R2R) networks 410, GPS satellite networks 412, MMC LAN 414 as well as one or a plurality of databases 410 and outside service providers 416. The one or a plurality of databases 410 may be maintained in the MMC 100'''' or in the network center 206'''. FIG. 4B shows an MMC Jr. implementation.

As discussed earlier, when a driver passes beneath an underpass, satellite radio broadcasts will be interrupted. Because the MMC 100'''' connects to redundant networks and can switch back and forth between them, the driver is insured uninterrupted coverage. Switching could take place between satellite input and WiFi input, for instance, where the satellite provider also has a real time web site.

If receiving the information was extremely important, and cost was not important, and a user had a subscription to cellular service, gaps in service could be filled in by switching between satellite and cellular service. Similar capabilities would exist for video and TV broadcasts.

Network Center

Figure 5:
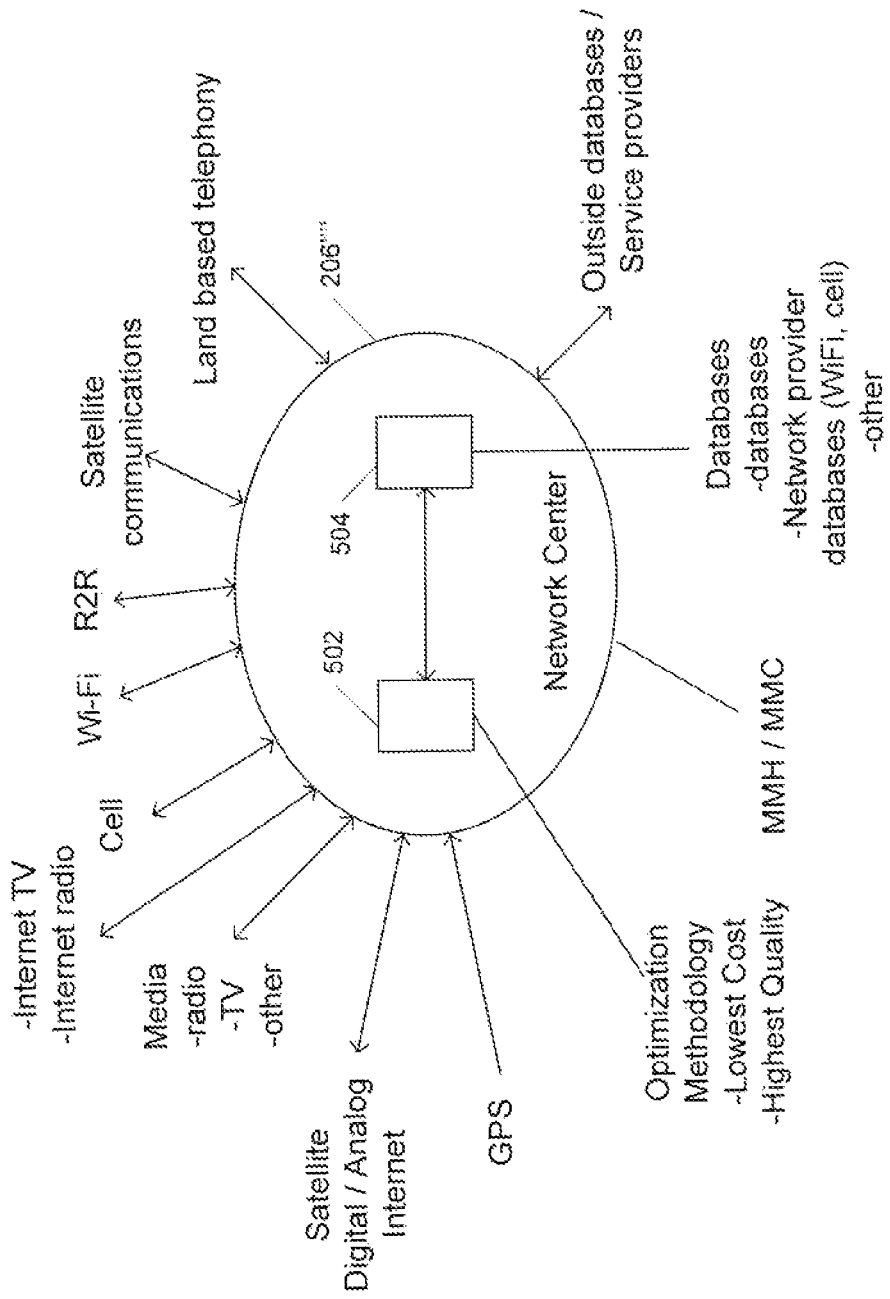
FIG. 5 illustrates the interconnectivity of the network center with data sources.

FIG. 5 illustrates the interconnectivity of the network center 206'''' with data sources. The network center 206'''' includes optimization technology 502 and one or more databases 504. Data sources include cell phone, WiFi, R2R, satellite communications, land-based telephony, outside databases and service providers, other databases including network provider databases (WiFi, cell, etc.), and other databases, the MMC 100, media (radio/television, and other media), satellite, digital, analog and Internet sources, GPS sources, and optimization services.

Hybrid Multimedia Communicator

In another embodiment, a hybrid multimedia communicator (MMH) is capable of operating between WiFi and cellular networks without dropping calls or data. It is especially important that data be communicated without interruption, since many of the services provided require continual data uploading, downloading, storage, and display. In this embodiment, the MMH protocol determines partnerships between unique cell providers, establishing a telephony protocol standard which is independent of individual WiFi or cell providers.

In conventional telephony, the user must depend upon point-to-point connections (from the user through a contiguous network to the destination). In the hybrid embodiment, however, the network center, which has telephony functionality, establishes the network connections for the user.

Head-End Hybrid Function

The MMH has the ability to pass not just voice or IP data between the MMC and the network center to the MMC client and the MMC, but also pass a data stream which is associated, for example, with uplink information, the GPS and traffic information.

With network center and uplink connectivity capability, the network center establishes the connectivity for the user and then establishes connectivity with the destination.

MMC Protocol Technology

Figure 6:
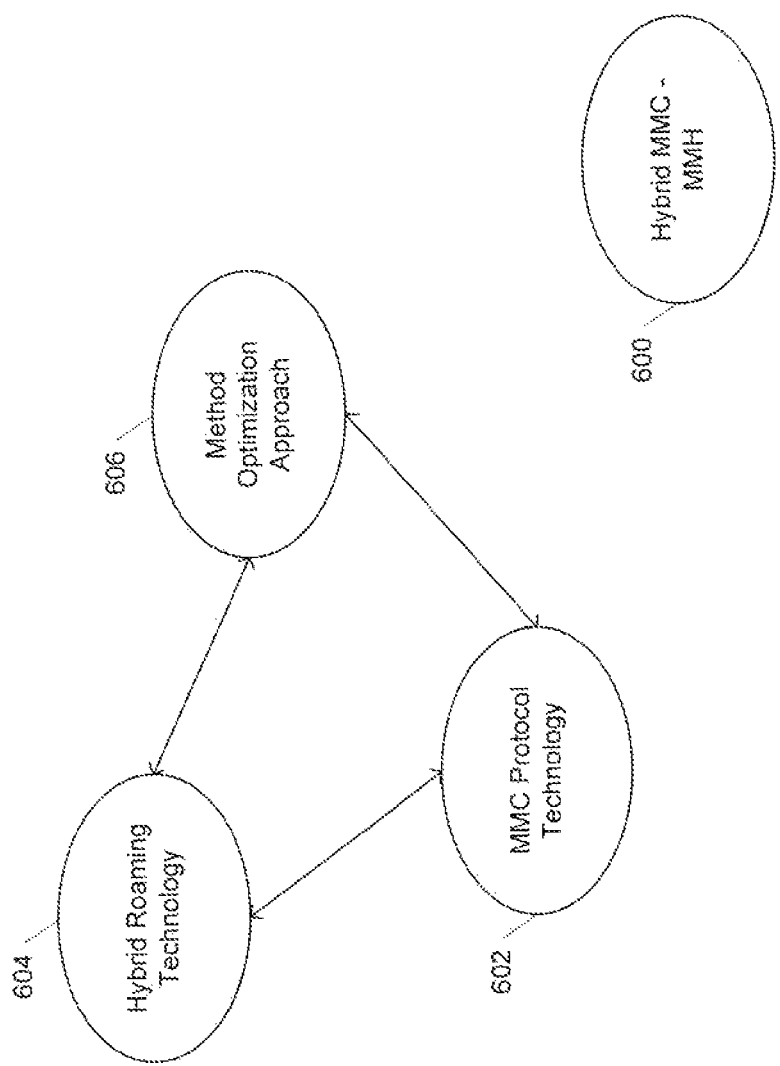
FIG. 6 shows the relationship between the MMH, MMC protocol technology, hybrid roaming technology and a method optimization approach.

FIG. 6 shows the relationship between the MMH 600, MMC protocol technology 602, hybrid roaming technology 604 and a method optimization approach 606. MMC 602/MMH 600 protocol contains the information, such as WiFi and cellular area subscription databases and authentication procedures which allow for networks to be connected to and billing to take place, for instance. Subscription rules for cellular networks and WiFi providers are typically stored either at the network center or within the MMC 100. The MMC protocol technology 602 includes cell network subscriber rules, WiFi provider rules, connectivity and cost requirements for providing all levels of quality, information to determine which is the best WiFi group to utilize for a specific area. In other words, the MMC protocol technology 602 allows the MMC 100 and/or MMH 600 to determine which services should be selected to provide least cost voice and data, thereby creating "intelligent roaming".

The database or databases utilized in the MMC protocol technology 602 and MMH protocol technology 600 include GPS information, WiFi provider databases, cellular provider databases, and procedures for quality and cost optimization services. For data, the protocol systems 600 and 602 also include buffer storage.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A multimedia communicator (MMC) comprising:
a processing unit;
a storage device coupled to the processing unit; and
at least one interface in communication with the processing unit to allow the multimedia communicator to offer a user a plurality of services;
wherein the MMC acts as a hybrid multimedia communicator in a hybrid environment, wherein a protocol of the hybrid multimedia communicator determines partnerships between one or more cellular providers;
wherein the hybrid multimedia communicator provides services at different levels of complexity comprising level 1 and level 2A;
wherein level 1 provides services at a lowest level of complexity including incoming information; and
wherein level 2A provides measurements from additional sensors comprising sensors installed on a vehicle or the MMC.

2. The multimedia communicator of claim 1 wherein the multimedia communicator is coupled to a plurality of databases which offer the different type of services.

3. The multimedia communicator of claim 2 wherein the databases are internal to the multimedia communicator.

4. The multimedia communicator of claim 2 wherein the multimedia communicator is utilized with multiple or redundant networks.

5. The multimedia communicator of claim 2 wherein the multimedia communicator is utilized with MMC Jr. client and R2R networks.

6. The multimedia communicator of claim 2 wherein the multimedia communicator is utilized with customized media insertion.

7. The multimedia communicator of claim 2 wherein the multimedia communicator is utilized with customized ad insertion.

8. The multimedia communicator of claim 2 wherein the multimedia communicator is utilized with optimizing services.

9. The multimedia communicator of claim 2 wherein the multimedia communicator is utilized with predictive/preference services/and autobilling services.

10. The multimedia communicator of claim 2 wherein the multimedia communicator is utilized with link services.

11. The multimedia communicator of claim 2 wherein the MMC is utilizing links services to obtain vendor locations.

12. The multimedia communicator of claim 2 wherein the MMC is utilizing links services to enable a transaction related to the vendor.

13. The multimedia communicator of claim 2 wherein the multimedia communicator is utilized with radio/Internet/media services received either from WiFi networks, satellite networks, and/or cellular networks, then rejoining the segmented packets of information, thereby overcoming the lack of contiguous signals and providing the user with a continuous playback uninterrupted by service disconnections.

14. The multimedia communicator of claim 2 wherein the multimedia communicator utilizes network centric functioning.

15. The multimedia communicator of claim 2 wherein the multimedia communicator utilizes peer-to-peer functioning.

16. The multimedia communicator of claim 2 wherein the multimedia communicator is utilized to provide coupons.

17. The multimedia communicator of claim 1 wherein the interfaces include any of and any combination of a WiFi connection/interface, uplink GPS/Traffic data connection/interface, cellular connection/interface, radio transmitter to radio transmitter (R2R) connection/interface, data services connection/interface, outside devices voice/location based services (LBC)/device connection/interface, subscriber database/Internet providers connection/interface, satellite network connection/interface, voice recognition protocol connection/interface, voice activated connection/interface, display connection/interface, linked services connection/interface, geographic links connection/interface, VoIP connection/interface, car cell phone connection/interface, and an outside providers services connection/interface.

18. The multimedia communicator of claim 1 wherein the multimedia may utilize a network function or a peer to peer function.

19. The multimedia communicator of claim 1 wherein the levels of complexity comprises level 2B, wherein level 2B provides for new sensing elements.

20. The multimedia communicator of claim 1 wherein the services comprise any of or any combination of geography-based services, location-based services, radio services, video services, playback of audio, video and data programming, telephony services including intelligent roaming and optimized cost- and quality-efficient services, cellular services, WiFi services, traffic information services, weather information services, integrated database services such as integrated traffic and weather services, traffic safety services, military logistics services, stock information services, product ordering and purchasing services which may be integrated with preference-based services, billing services, optimization of cost and quality level of services, customized advertising services and customized media insertion services.

* * * * *